(12) United States Patent
Yeo

(10) Patent No.: US 6,452,885 B1
(45) Date of Patent: Sep. 17, 2002

(54) COPY PROTECTION SYSTEM AND METHOD FOR OPTICAL DISKS AND A COPY PROTECTED OPTICAL DISK

(75) Inventor: Wong-Seong Yeo, Chungcheongbuk-Do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/112,982

(22) Filed: Jul. 10, 1998

(30) Foreign Application Priority Data

Jul. 14, 1997 (KR) ............................................. 97/32576

(51) Int. Cl.$^7$ ................................................. G11B 7/00
(52) U.S. Cl. ................................. 369/53.21; 369/47.12; 369/275.5
(58) Field of Search ............................. 369/47, 48, 49, 369/50, 54, 58, 59, 47.1, 47.11, 47.12, 47.13, 53.1, 53.11, 53.12, 53.2, 53.21, 53.42, 53.44, 59.1, 59.23, 275.5

(56) References Cited

U.S. PATENT DOCUMENTS

| | | | |
|---|---|---|---|
| 4,849,836 A | | 7/1989 | Kachikian |
| 5,579,003 A | * | 11/1996 | Hirayama et al. ............ 341/59 |
| 5,696,757 A | | 12/1997 | Ozaki et al. |
| 5,734,787 A | * | 3/1998 | Yonemitsu et al. ....... 369/59 X |
| 5,912,869 A | * | 6/1999 | Tanaka et al. ................ 369/59 |

* cited by examiner

Primary Examiner—Muhammad Edun
(74) Attorney, Agent, or Firm—Birch, Stewart, Kolasch & Birch, LLP

(57) ABSTRACT

The method and apparatus for copy protecting an optical disk records test data, including modified first signals, on an optical disk such that, when reproduced, random ones of these modified first signals are reproduced as second signals. Both the first and second signals represent data having at least two zeros between successive ones. The method and apparatus for optical disk authentication and reproduction creates a statistical version of the test data through repeated reproduction of the test data. If the test data matches references data, possibly recorded on the optical disk as well, the optical disk is authenticated. Once authenticated, reproduction of the optical disk is permitted. If the test data forms part of the data for reproduction, then the statistical data is output as the reproduced data.

47 Claims, 10 Drawing Sheets

TABLE 1 8-14 BIT CONVERSION TABLE OF A COMPACT DISC (3/3)

| DECIMAL | BINARY | AFTER EFM CONVERSION | DECIMAL | BINARY | AFTER EFM CONVERSION |
|---|---|---|---|---|---|
| 200 | 11001000 | 00001001000001 | 250 | 11111010 | 10010000010010 |
| 201 | 11001001 | 10000100000001 | 251 | 11111011 | 10001000010010 |
| 202 | 11001010 | 00001001000100 | 252 | 11111100 | 01000000010010 |
| 203 | 11001011 | 00001001000000 | 253 | 11111101 | 00001000010010 |
| 204 | 11001100 | 01000100000001 | 254 | 11111110 | 00010000010010 |
| 205 | 11001101 | 00000100000001 | 255 | 11111111 | 00100000010010 |
| 206 | 11001110 | 00000010010000 | | | |
| 207 | 11001111 | 00100100000001 | | | |
| 208 | 11010000 | 00000100100100 | | | |
| 209 | 11010001 | 10000010010001 | | | |
| 210 | 11010010 | 10010010010001 | | | |
| 211 | 11010011 | 10000100100000 | | | |
| 212 | 11010100 | 01000010010001 | | | |
| 213 | 11010101 | 00000010010001 | | | |
| 214 | 11010110 | 00010010010001 | | | |
| 215 | 11010111 | 00100010010001 | | | |
| 216 | 11011000 | 01001000010001 | | | |
| 217 | 11011001 | 10000000010001 | | | |
| 218 | 11011010 | 10010000010001 | | | |
| 219 | 11011011 | 10001000010001 | | | |
| 220 | 11011100 | 01000000010001 | | | |
| 221 | 11011101 | 00001000010001 | | | |
| 222 | 11011110 | 00010000010001 | | | |
| 223 | 11011111 | 00100000010001 | | | |
| 224 | 11100000 | 01000100000010 | | | |
| 225 | 11100001 | 00000100000010 | | | |
| 226 | 11100010 | 10000100010010 | | | |
| 227 | 11100011 | 00100100000010 | | | |
| 228 | 11100100 | 01000100010010 | | | |
| 229 | 11100101 | 00000100010010 | | | |
| 230 | 11100110 | 01000000100010 | | | |
| 231 | 11100111 | 00100100010010 | | | |
| 232 | 11101000 | 10000100000010 | | | |
| 233 | 11101001 | 10000100000100 | | | |
| 234 | 11101010 | 00001001001001 | | | |
| 235 | 11101011 | 00001001000010 | | | |
| 236 | 11101100 | 01000100000100 | | | |
| 237 | 11101101 | 00000100000100 | | | |
| 238 | 11101110 | 00010000100010 | | | |
| 239 | 11101111 | 00100100000100 | | | |
| 240 | 11110000 | 00000100100010 | | | |
| 241 | 11110001 | 10000010010010 | | | |
| 242 | 11110010 | 10010010010010 | | | |
| 243 | 11110011 | 00001000100010 | | | |
| 244 | 11110100 | 01000010010010 | | | |
| 245 | 11110101 | 00000010010010 | | | |
| 246 | 11110110 | 00010010010010 | | | |
| 247 | 11110111 | 00100010010010 | | | |
| 248 | 11111000 | 01001000010010 | | | |
| 249 | 11111001 | 10000000010010 | | | |

FIG.1

FREQUENCY OF ERROR FOR REPRODUCED SIGNALS

| DRIVE DEVICE | 2X CD-ROM | | 4X CD-ROM | | 8X CD-ROM | | 16X CD-ROM | |
|---|---|---|---|---|---|---|---|---|
| SIGNAL | A | B | A | B | A | B | A | B |
| COMPARATIVE | 20 | 20 | 20 | 20 | 20 | 20 | 20 | 20 |
| EMBODIMENT 1 | 19 | 21 | 18 | 22 | 19 | 21 | 19 | 21 |
| EMBODIMENT 2 | 15 | 25 | 16 | 24 | 14 | 26 | 15 | 25 |
| EMBODIMENT 3 | 12 | 28 | 11 | 29 | 12 | 28 | 12 | 28 |
| EMBODIMENT 4 | 8 | 32 | 9 | 31 | 8 | 32 | 8 | 32 |

FIG.5

14-BIT SIGNAL PAIRS 10010000000100
10010000000010

10000001000010
10000000100010

10000001000100
10000000100100

10000010001000
10000001000100

COPY PROTECTION SYSTEM AND METHOD FOR OPTICAL DISKS AND A COPY PROTECTED OPTICAL DISK

BACKGROUND OF THE INVENTION

1. Field of the Invention

The present invention relates to a copy protection system and method for optical disks, and a copy protected optical disk.

2. Description in of Related Art

Optical disks, such as compact disks, have been developed and produced since 1981. Because of their large memory capacity, the use of optical discs and their production has dramatically increased. Besides their large storage capacity, optical discs make it possible to copy information at relatively low cost while keeping signal quality substantially the same as the disk being copied.

It is now possible for almost anyone to manufacture optical discs easily due to the low-cost of production equipment. Unfortunately, it has also become easier to manufacture illegal copies of optical discs containing valuable software. This has resulted in great financial losses to the software industry. Illegal copying has also had detrimental effects on software development. Namely, companies are less willing to invest substantial time and money in the development of software.

Various techniques have been proposed to prevent illegal copying of optical disks. Examples of such techniques include the use of holograms placed on the optical disk, use of a serial number added to the software recorded on the disk, and the requirement that users enter an identification number or password to operate the software on a disk. However, these techniques have proved inefficient, and disadvantageously increase the cost of producing an optical disk.

SUMMARY OF THE INVENTION

The present invention relates to a method and apparatus for copy protecting an optical disk wherein test data, including modified first signals, is recorded on an optical disk such that, when reproduced, random ones of these modified first signals are reproduced as second signals. Both the first and second signals represent data having at least two zeros between successive ones.

The present invention further relates to a method and apparatus for optical disk authentication and reproduction. An optical disk is authenticated by creating a statistical version of the test data through repeated reproduction of the test data. If the test data matches references data, possibly recorded on the optical disk as well, the optical disk is authenticated. Once authenticated, reproduction of the optical disk is permitted. If the test data forms part of the data for reproduction, then the statistical data is output as the reproduced data.

The present invention further relates to an optical disk having been copy protected according to the present invention.

BRIEF DESCRIPTION OF THE DRAWINGS

The present invention will become more fully understood from the detailed description given here-in-below and the accompanying drawings which are given by way of illustration only, wherein like reference numerals designate corresponding parts in the various drawings, and wherein:

FIG. 1 is an 8–14 bit conversion table;

FIG. 5 illustrates the frequency of errors in the reproduced signals from optical disks produced according to the comparison study and studies in accordance with the present invention;

DETAILED DESCRIPTION OF THE PREFERRED EMBODIMENTS

Figure 2:
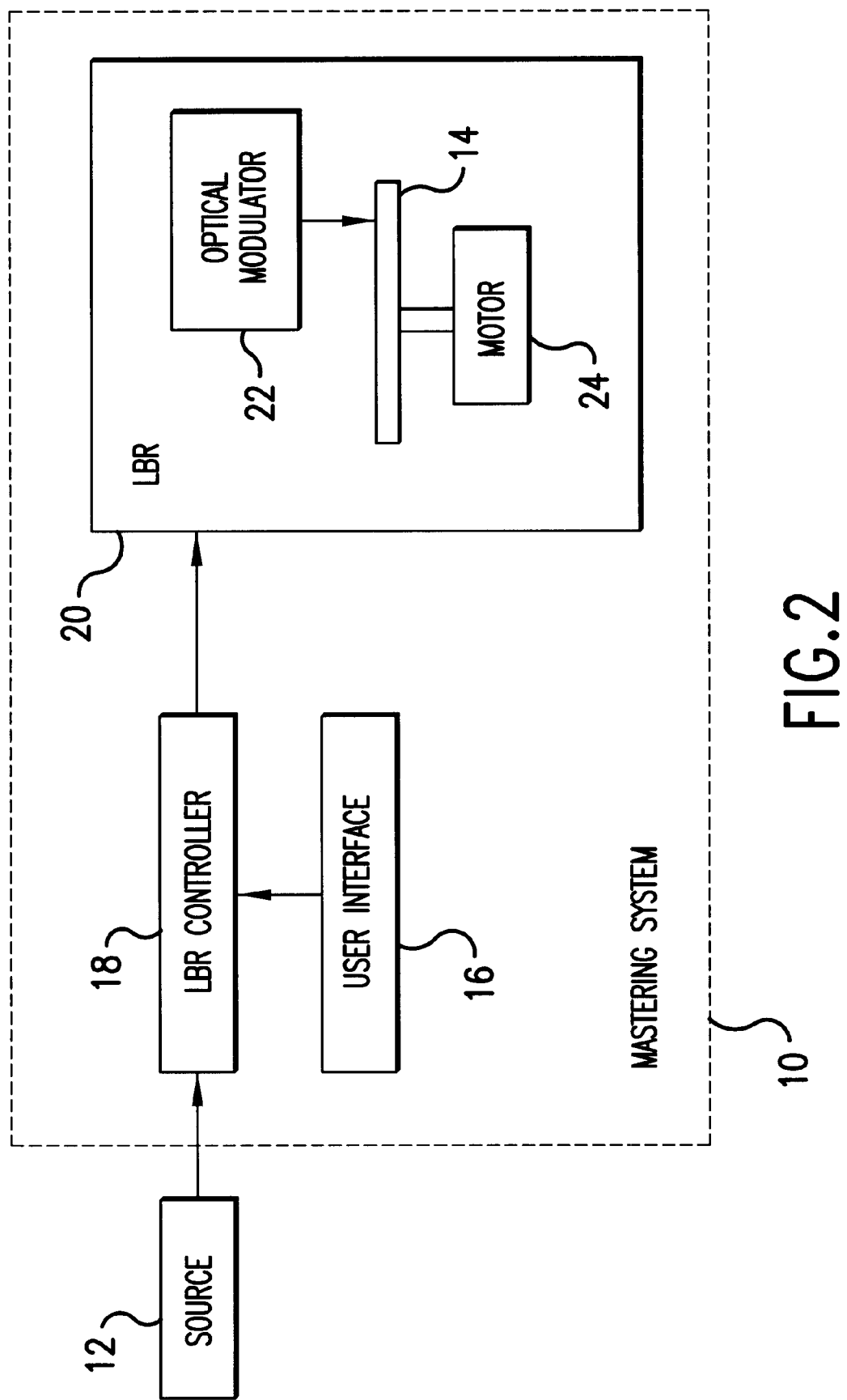
FIG. 2 illustrates an embodiment of a mastering system employing a copy protection method according to the present invention.

Recording signals on a compact disk is performed by 8–14 transformation, i.e., EFM transformation (Eight to Fourteen Transformation). The 8–14 transformation transforms 8-bit information into 14-bit information. Traditionally EFM transformation generates signals recorded on a compact disk, wherein '1' does not appear in succession, and two to ten '0's appear between each '1'. To satisfy this signal rule, 14-bit signals transformed by the 8–14 transformation may have a 3-bit signal (called 'the merging bit') in between the separate 14-bit signals when written in succession An 8–14 transformation table is shown in FIG. 1. As shown, signals contained on a compact disk can be distinguished based upon the number of '0's which are present between successive '1s'. Signals are thus divided into 9 kinds, from the shortest signal having two '0's between each '1' (called '3T') to the longest signal having ten '0's therebetween (called '11T').

The 14-bit signals recorded on a compact disk are, inversely, restored to 8-bit signals when reproduced by reading the number of '0's between successive '1s'. When a variance is detected in the interval between two '1's ("the signal length"), an error is identified.

In the above described 8–14 transformation, the signal length is an important element in the determination of reproduced signals since signals different from the original signals may be reproduced if the signal length is varied. Having researched this, the inventors discovered that if a part of signals recorded on a compact disk are modified during production of a stamper (master disk used to produce optical disks), errors may or may not be generated during reproduction.

As a result of empirically investigating the errors, the inventors determined that some 8-bit signals have associated 14-bit signals which are very similar to the 14-bit signals for other 8-bit signals. For example, the 8-bit signal 1011010 converts to the 14-bit signal 10010000000100 and the 8-bit signal 1111010 converts to the 14-bit signal 10010000000010. The number of '0's between the second '1' and the third '1' in these two 14-bit signals is 7 and 8, respectively, and the other portions of the 14-bit signals are the same. When 14-bit signals are written on a compact disk, the above two signals have a difference of 8T vs. 9T. In other words, the first 14-bit signal equals 3T8T, and is similar to the second 14-bit signal of 3T9T. Further, the signal length after the third '1' is not considered as important, because it varies according to the merging bit.

The following feature is derived out of the structure of the above two signals. First, assume signal A represents the first 8-bit/14-bit signal 1011010/10010000000100 and signal B represents the second 8-bit/14-bit signal 1111010/10010000000010. In signal A, the number of '0's between the 1's in the 14-bit signal is 2 and 7, and in signal B, 2 and 8. The signals contained on the compact disk have a run length corresponding to the number of successive '0's. In other words, when signal A is reproduced from the disk, the 8-bit signal demodulated from the 14-bit signal is '1011010', and when signal B is reproduced from the disk, the 8-bit signal demodulated from the 14-bit signal is '1111010'; the 8-bit signals being determined according to the number of '0's after the second '1', i.e., seven or eight '0's. By using the above features, it is possible to distort the 8-bit signals demodulated from reproduced signals so that when the 8-bit signals are copied onto another disk, whether the copy disk is an illegal copy can be determined.

FIG. 2 illustrates an embodiment of a mastering system employing the copy protection method according to the present invention. In a preferred embodiment, the mastering system 10 in FIG. 2 is a Uni 3000 Mastering System from First Light Technology with the MIS V6 module produced by Doug Carson & Associates (DCA). The MIS V6 module from DCA enables an operator to edit individual run length pulses. Namely, when mastering compact disks and digital versatile disks, the operator can set the leading and trailing edge advance/delay, as well as the pulse amplitude for each run length. The mastering system 10 records digital data from a source 12 on a stamper 14. The stamper 14 is then used in a standard optical disk formation process to produce optical disks.

As shown in FIG. 2, the mastering system 10 includes a laser beam recorder (LBR) controller 18 which controls the operation of an LBR 20 based on user input received via a user interface 16. The LBR 20 includes, at least, an optical modulator 22 for recording data on the stamper 14, and a motor 24 for rotating the stamper 14 during the recording process.

In operation, a user instructs the LBR controller 18, via the user interface 16, to record digital data received from the source 12 by employing the copy protection method according to the present invention. The LBR controller 18 controls the LBR 20 so that the digital data from the source 12 is recorded according to the copy protection method of the present invention.

Figure 3:
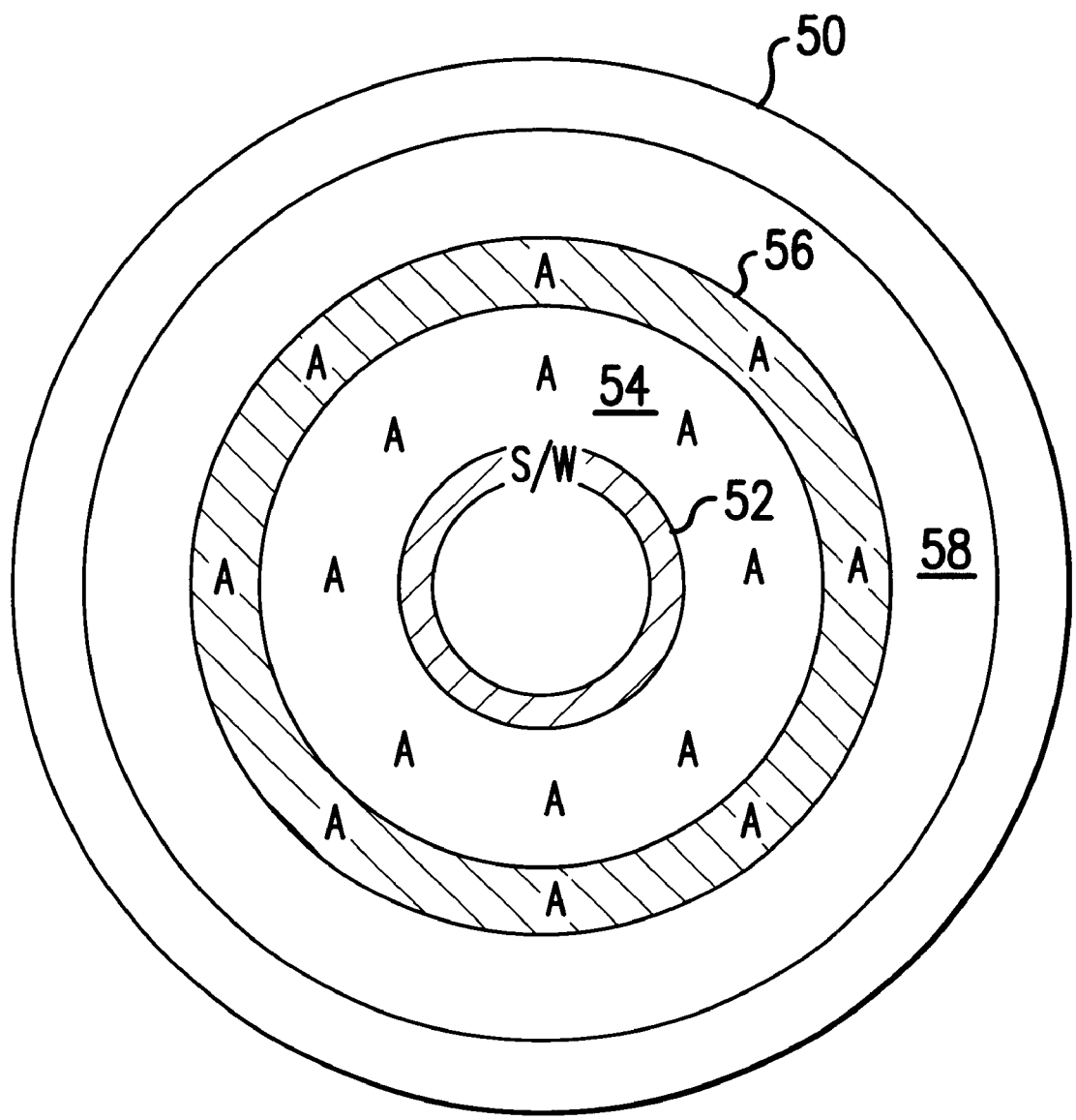
FIG. 3 illustrates a copy protected optical disk according to the present invention.

FIG. 3 illustrates an optical disk having data recorded thereon according to the copy protection method according to the present invention. As shown in FIG. 3, the mastering system 10 records digital data onto the stamper 14 such that an optical disk 50 produced using the stamper 14 includes software 52, reference data 54, modified data 56, and other data 58. The other data 58 is the main data stored in a main storage area of the optical disk 50. The software 52 is recorded at the inner most circumference of the optical disk. The software 52 includes an initialization or auto execution program, and the initialization or auto execution program includes a disk authentication program according to the present invention. The disk authentication method according to the present invention will be discussed in more detail below.

The reference data 54 includes data of a predetermined size, for example, 5120 bytes, and includes 20 signal As and 20 signal Bs. The modified data 56 is the same as the reference data 54 except that the signal As have been modified. Specifically, the mastering system 10 makes the length of the 8T pit in the signal A of the modified data 56 greater than the length of a standard 8T pit by a predetermined amount. During reproduction, some of the modified signal As will be reproduced as modified signal Bs.

Empirical studies on lengthening the 8T pit were performed. In a comparison study, serving as a comparison for the studies according to the present invention discussed in detail below, data having a predetermined size of 5120 bytes including 20 signals A (1011010, 10010000000100) and 20 signals B (1111010, 10010000000010) was prepared from the 256 ASCII codes. This data was recorded on a stamper using a conventional method, and two hundred compact disks were manufactured.

In a first study according to the present invention, the data of the comparison study was recorded on a stamper; however, the 8T signal included in each signal A was lengthened by 0.2T (46.3 nSec.), while the other signals 3T, 4T, etc. were processed with no distortion. Two hundred compact disks were then manufactured using this stamper. In a second study according to the present invention, the data of the comparison study was recorded on a stamper; however, the 8T signal included in each signal A was distorted by a 0.3T (69.4 nSec.) increase, while the other signals 3T, 4T, etc. were processed with no distortion from the comparative embodiment. Two hundred compact disks were then manufactured using this stamper.

In a third study according to the present invention, the data of the comparison study was recorded on a stamper; however, the 8T signal included in each signal A was distorted by a 0.4T (92.7 nSec.) increase, while the other signals 3T, 4T, etc. were processed with no distortion from the comparative embodiment. Two hundred compact disks were then manufactured using this stamper. In a fourth study, according to the present invention, the data of the comparison study was recorded on a stamper; however, the 8T signal included in each signal A was distorted by a 0.5T (115.7 nSec.) increase, while the other signals 3T, 4T, etc. were processed with no distortion from the comparative embodiment. Two hundred compact disks were then manufactured using this stamper.

The first fifty disks manufactured in each study were discarded (a compact disk is manufactured by injection molding, and the first manufactured disks contain defects), and then 10 disks from each of the above studies were randomly selected for purposes of evaluation.

First, the compact disk jitter of each study was measured. Jitter is defined as the deviation of the signal length from the prescribed value, and the standard deviation thereof is prescribed as 35 nSec. or below. For all compact disks manufactured from each study, a jitter of 27–28 nSec. was measured. Thus, it was determined that no difference in quality exists between the disks.

However, for the 8T signal distorted at signal recordation, there was a difference in the average jitter value for all embodiments. The average of the measured value for the of signal was 1850 nSec. in the comparison study, 1895 nSec. in the first study, 1920 nSec. in the second study, 1945 nSec. in the third study, and 1965 nSec. in the fourth study. As a result, it can be understood that there is a difference in the average value, but not in the deviation.

FIGS. 4A to 4E represent the distribution of the signals for each of 3T to 11T read from the compact disks which were manufactured in the comparison and first through fourth studies, respectively.

With reference to FIGS. 4A to 4E, the appearance frequency of 3T and 11T is high since the merging bit includes 3T and a plurality of 11T's are utilized to identify the beginning and ending portions of a compact disk.

Figure 4A:
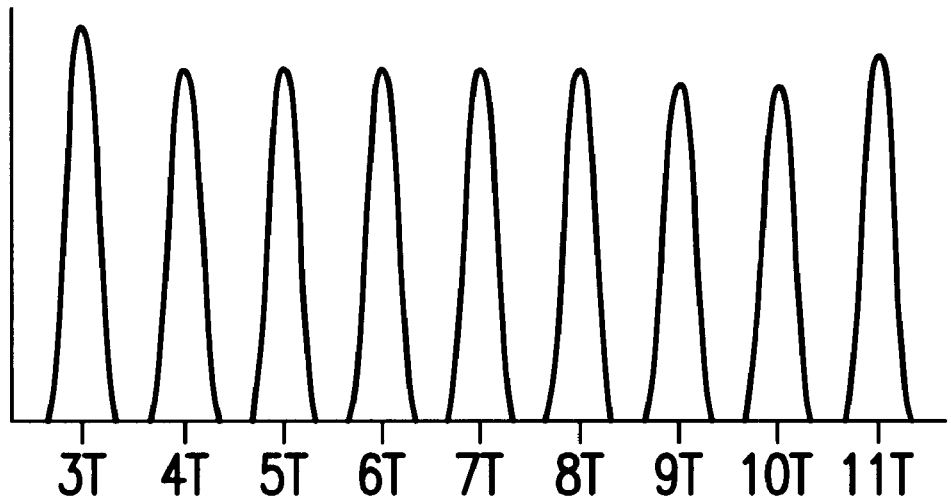
FIGS. 4A–4E illustrate the distribution of signals read from compact disks according to a comparison study and studies in accordance with the present invention.
Figure 4B:
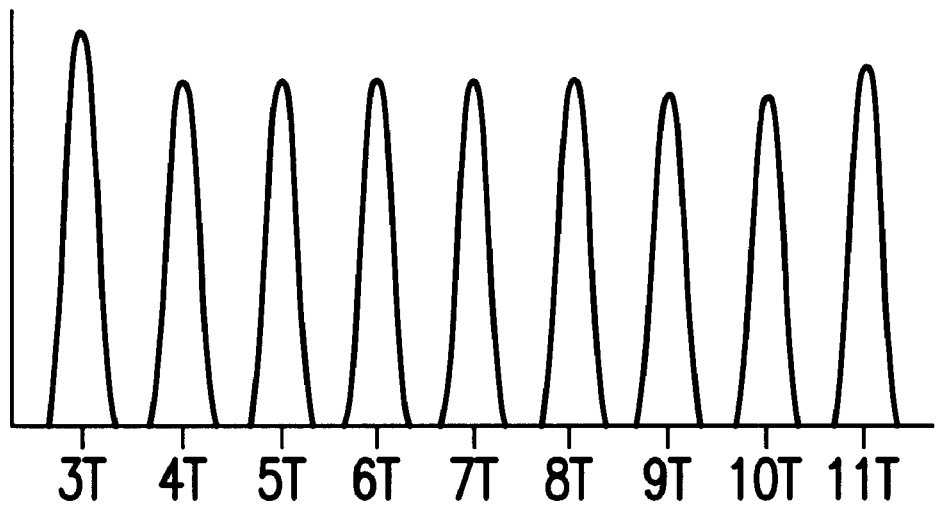
Figure 4C:
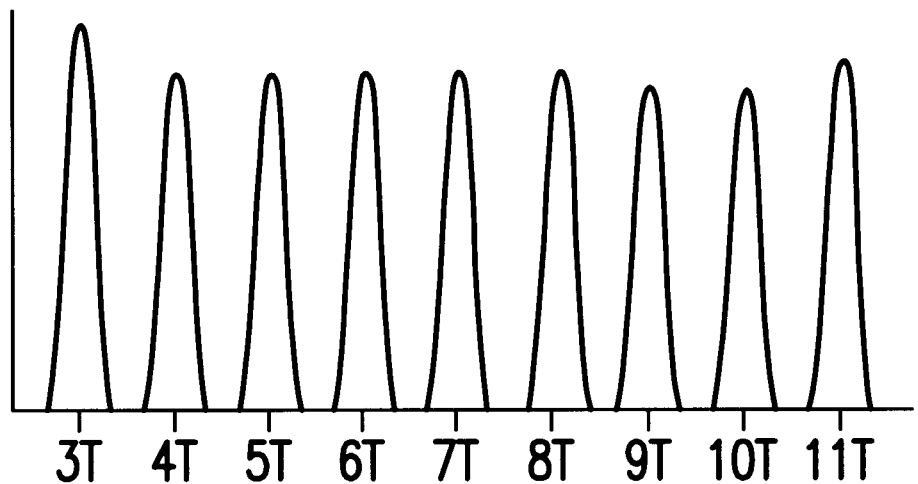
Figure 4D:
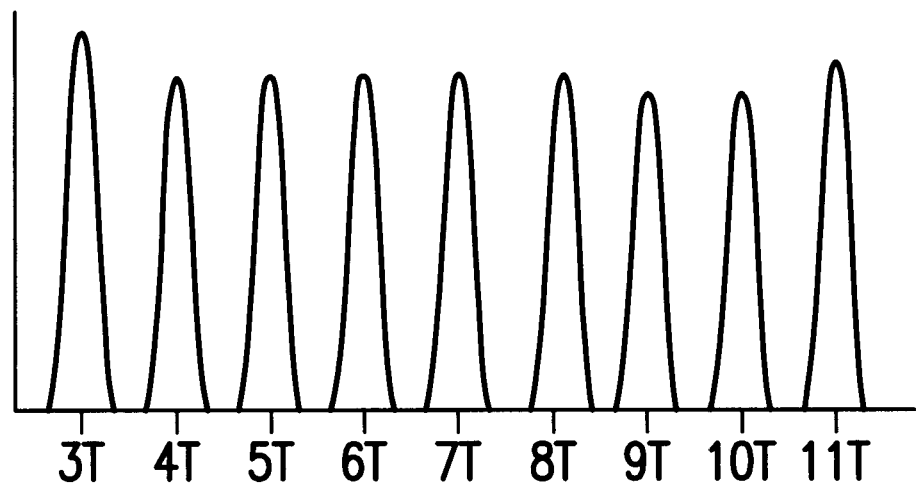
Figure 4E:
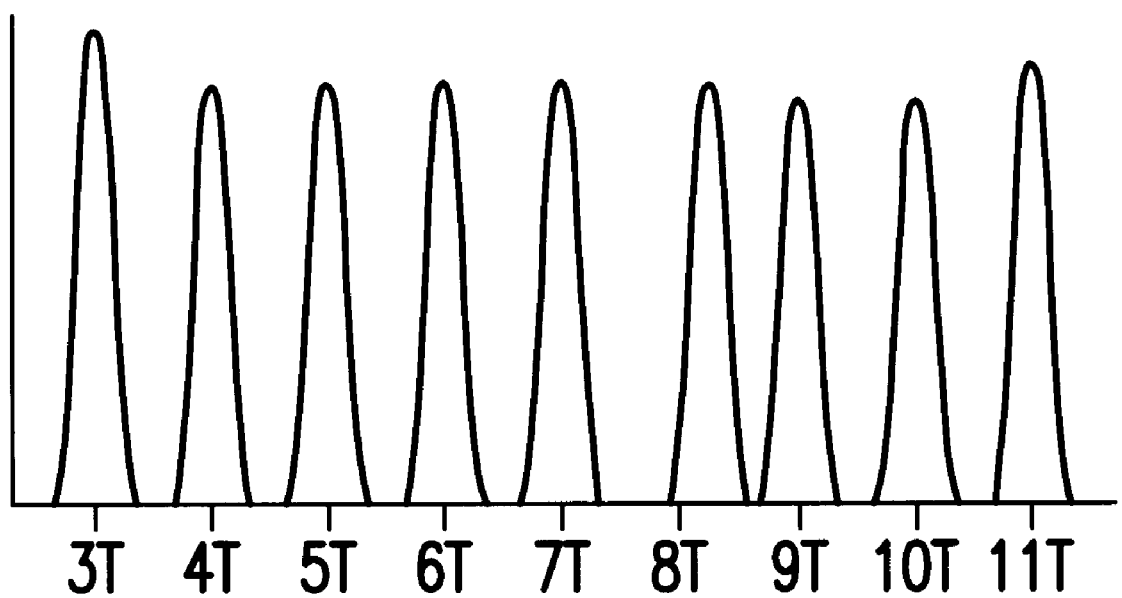

For the comparison study, FIG. 4A shows that the distribution for each T is constant except for the case of 3T and 11T for the reasons stated above.

For the first through fourth studies (i.e., embodiments of the present invention) shown in FIGS. 4B to 4E, the appearance frequency of 3T and 11T is high and the distribution for each T is constant. In this regard, since the signals of the 8T signals were modified by 0.2T, 0.3T, 0.4T and 0.5T in the respective studies, it should be understood that the distribution of 8T is biased towards 9T by the delayed period. Thus, it can be understood that the signals were recorded according to the intent of the present invention.

Whether signal A is mistakenly recognized as signal B was also examined for the compact disks prepared according to the comparison study and the first-fourth studies. The frequency of the error was detected by determining the frequency that signal A, modified by the predetermined period, was mistakenly read out as signal B, despite the error allowance of a compact disk reproducing device.

As described above, signals modulated by the 8–14 transformation are recorded on a compact disk. But when reproducing the data on the disk, the recorded signals are read out and demodulated by the inverse 8–14 transformation, and are restored to the original 8-bit signals. If a reproduced 14-bit signal does not correspond to an 8-bit signal present in Table 1, an error is identified, and the data is re-read or an error message is output. However, in the embodiments according to the present invention, when the 8T of signal A is mistakenly read out as 9T, signal B is output without the generation of error because signal B containing 9T is present in Table 1. Therefore, the error frequency was investigated by comparing the number of times signals A and B were output, each signal having been included 20 times in the data on the respective compact disks of the comparison study and each of the first-fourth studies according to the present invention. In order to reproduce the data on the compact disks, 2×, 4×, 8× and 16×CD-ROM drive devices manufactured by LG Electronic Co., Ltd. were utilized. The results are illustrated in the table shown in FIG. 5.

The above results were achieved by measuring the frequency of errors for the selected 10 disks of each study, and rounding the average error frequency to one decimal place.

As shown in the table of FIG. 5, because signals A and B were recorded without distortion in the comparison study, the signals A and B have been reproduced 20 times respectively in all 10 compact disks of this study. According to these results, the CD-ROM drive device is shown to be working normally and the compact disks are operating normally.

Signal B was mistaken once or twice by the CD-ROM drive device for signal A in reproducing the disks of the first study.

The CD-ROM drive device mistakenly reproduced signal A as signal B four or five times in reproducing the disks of the second study.

The CD-ROM drive device mistakenly reproduced signal A as signal B seven or eight times in reproducing the disks of the third study.

The CD-ROM drive device mistakenly reproduced signal A as signal B eleven or twelve times in reproducing the disks of the fourth study.

As shown above, output signals different from the original signals recorded on the compact disks were reproduced, and the frequency of such mistaken reproduction varied according to the length of the modified pits. Further, according to careful observation of repeated reproduction of this data, the signals which were mistaken as signal B from among the 20 signals A recorded on each compact disk occurred randomly.

Accordingly, it was found that misrecognition of signals rather than signal errors could be caused by choosing appropriate signals and modifying the signals a little during recordation.

The typical copyist repeatedly makes copies from an optical disk. As discussed above, copying a disk manufactured according to the copy protection method according to the present invention results in the copied disk having errors therein. Namely, instead of correctly copying a signal A onto a new disk, the copyist will randomly record signal B for some of those signals A having been modified according to the present invention.

Figures 6, 7:
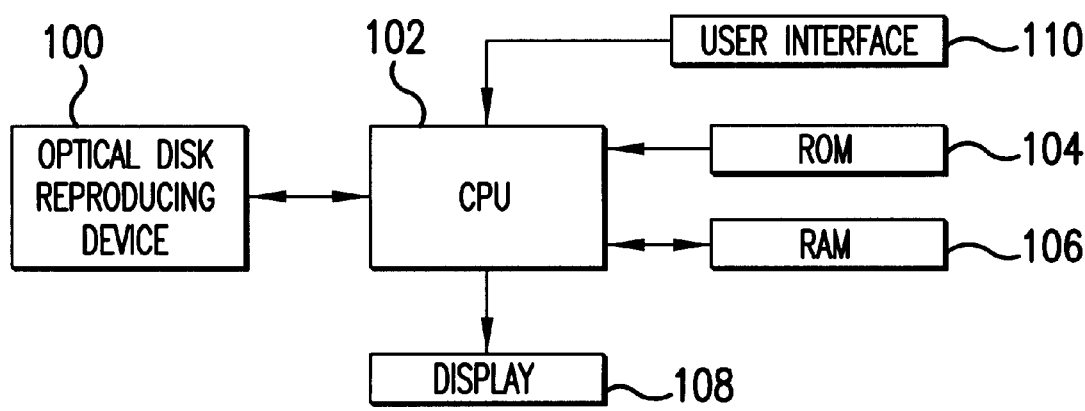
FIG. 6 illustrates related signal pairs.
FIG. 7 illustrates an optical disk reproducing apparatus according to the present invention.

In an alternative embodiment, instead of or in addition to increasing the pit length of the pit representing an 8T signal, the pit length of a 9T signal is decreased by a predetermined amount such that the 9T signals are randomly mistaken as 8T signals depending on the decrease in pit length. In a further alternative, other closely related signal pairs other than signal A and signal B identified above are used instead of or in addition to the signal pair of signal A and signal B. FIG. 6 illustrates some of these other signal pairs which were identified through empirical study.

Furthermore, the amount by which a signal is modified is not limited to the 0.2T–0.5T examples given above. Preferably, the amount of modification, increase and/or decrease, is based on the type of optical disk drive or components forming the optical disk drive. Based on the present disclosure, it is well within the knowledge of one skilled in the art to empirically determine a preferred amount of modification for a given optical disk drive and type of optical disk.

It should be noted that modifying signals (e.g., lengthening and/or shortening signals) such as 8T and 9T, and controlling the amount of the modification, are achieved by controlling the leading and/or trailing edge advance/delay.

Also, the references and test data 54 and 56 are not limited to being 5120 bytes long. Instead, the reference and test data 54 and 56 may be greater or less than 5120 bytes. It should be understood from the discussion below, however, that as the amount of reference and test data 54 and 56 increase, so does the level of copy protection. It should be further understood that the reference and test data 54 and 56 are not limited to including only 20 signals A and 20 signals B.

As a further alternative, instead of supplying the reference data 54 on the copy protected disk, the reference data 54 can be supplied in various other manners such as via the internet and a magnetic disk.

Next, the system and method of authenticating an optical disk and reproducing data from an optical disk copy protected according to the present invention will be described. For the purposes of discussion only, it will be assumed that the optical disk is a compact disk manufactured according to the second study discussed above.

FIG. 7 illustrates an optical disk reproducing apparatus according to the present invention. As shown, the optical disk reproducing apparatus includes an optical disk reproducing device 100 for reproducing data from an optical disk and a central processing unit (CPU) 102 connected to the optical disk reproducing device 100. A read-only memory (ROM) 104, a random-access memory (RAM) 106, a display 108, and a user interface 110 (e.g., a keyboard) are also connected to the CPU 102.

Based on user input received via the user interface 110, the CPU 102 controls the optical disk reproducing device 100 based on programming stored in the ROM 104. The data reproduced by the optical disk reproducing device 100 is stored by the CPU 102 in the RAM 106. Authenticating an optical disk and reproducing data therefrom will now be described with reference to FIGS. 7–9C.

Figure 8:
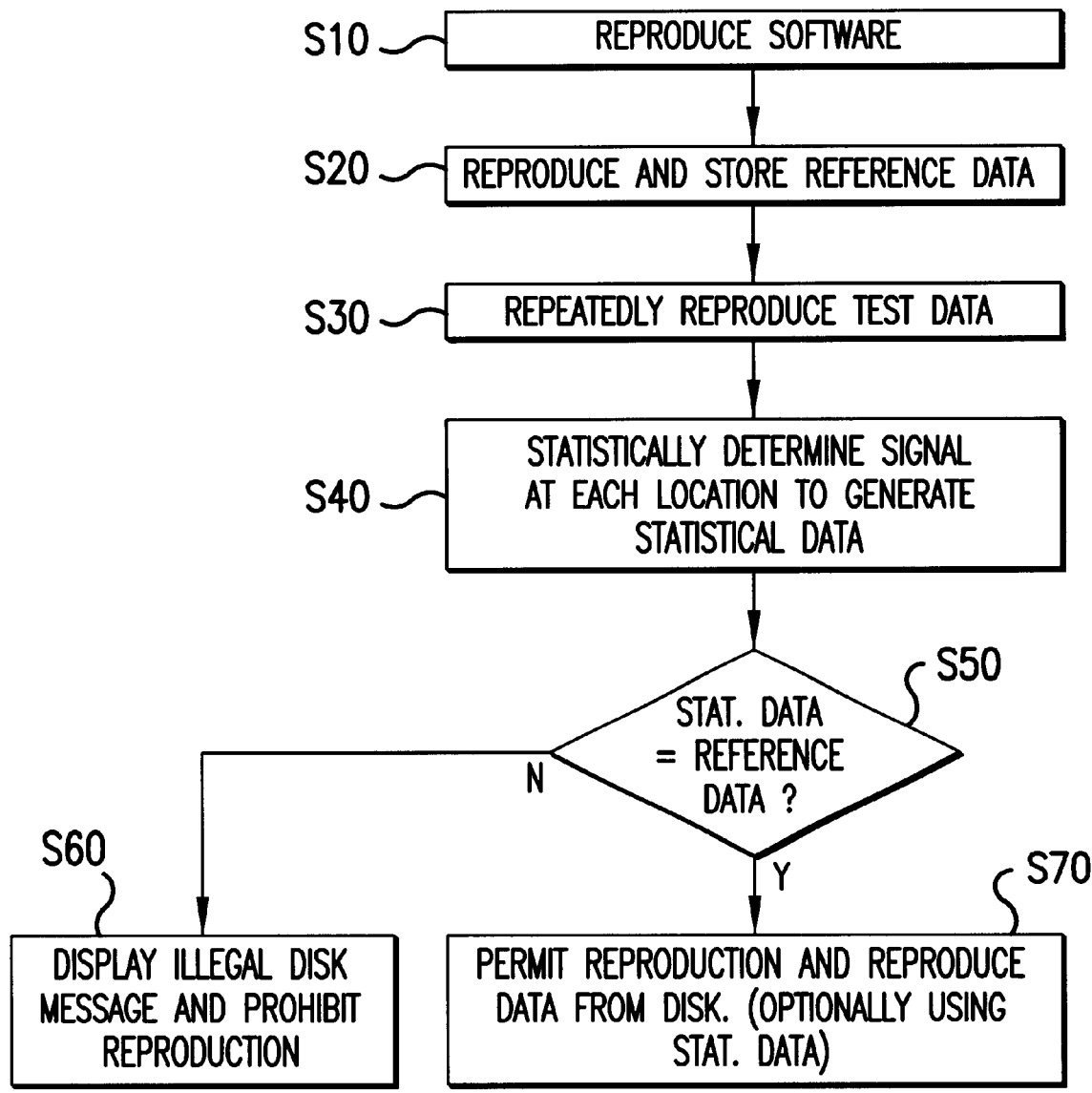
FIG. 8 illustrates a flow chart of the optical disk authentication method and the data reproduction method according to the present invention.

FIG. 8 illustrates a flow chart of the optical disk authentication method and the data reproduction method according to the present invention. As shown, in step S10 the CPU 10 controls the optical disk reproducing device 100 to reproduce the software 52. The CPU 10, in accordance with the reproduced software 52, operates according to the remainder of the flow chart illustrated in FIG. 8.

Figure 9C:
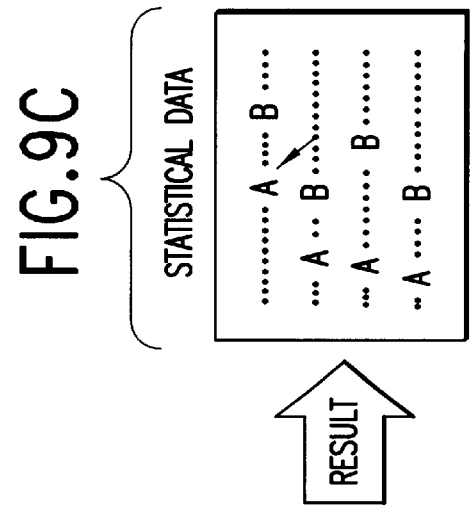
FIGS. 9A–9C illustrate portions of reference and reproduction data generated during performance of the methods flow charted in FIG. 8.
Figure 9A:
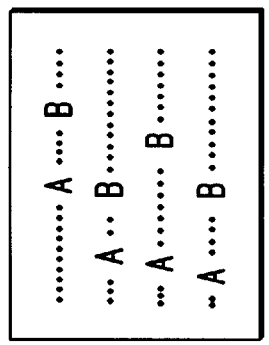

Next, in step S20, based on the location of the reference data 54 given by the software 52, the CPU 102 causes the optical disk reproducing apparatus 100 to reproduce the reference data 54. As discussed above, the reference data 54 includes 20 signals A and 20 signals B. A portion of the reference data 54 is shown in FIG. 9A. The CPU 102 stores the reference data 54 in the RAM 106.

Figure 9B:
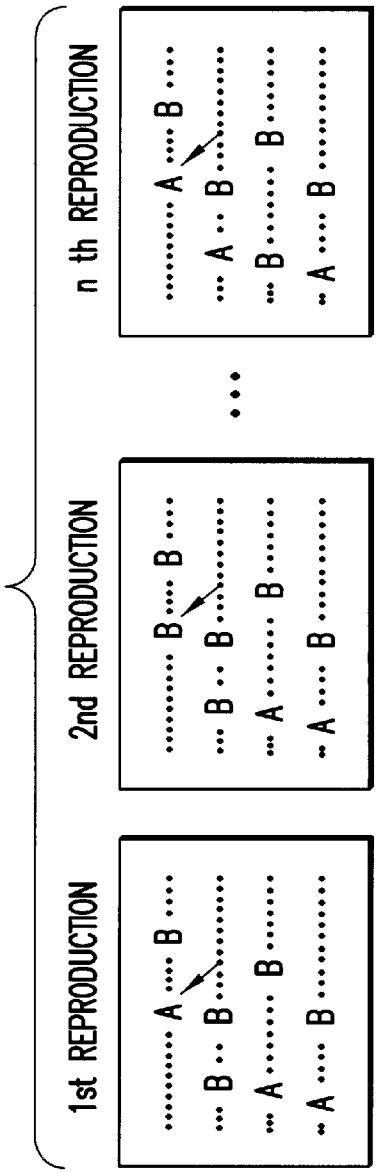

Based on the location of the test data 56 given by the software 52, the CPU 102 causes, in step S30, the optical disk reproducing apparatus 100 to reproduce the test data 56 a number of times specified by the software 52. For example, for the compact disk according to the above assumption, which includes test data recorded as discussed with respect to the second study, the test data 56 is reproduced 20 times. FIG. 9B illustrates a portion of the reproduced test data 56. As shown, some of the signals A have been mistakenly reproduced as signals B.

In step S40, the CPU 102 determines the number of times a particular signal appears at a particular location in the 20 stored versions of the test data 56. For example, at a particular location, the CPU 102 may determine 18 signal As and 2 signal Bs. The CPU 102 compares the number of times a particular signal appears at a particular location to a threshold given by the software 52. For the assumed compact disk, an example of the threshold is 16. If the number of times exceeds the threshold, the CPU 102 stores the signal corresponding to that number of times as actual data. The CPU 102 repeats this process for each location to produce a statistical version of the test data; hereinafter referred to as the statistical data. FIG. 9C illustrates a portion of the statistical data corresponding to the reference data 54 and the test data 56 in FIGS. 9A and 9B. Because it takes less than 1 second for a 2×CD-ROM drive to reproduce the test data of 5120 bytes, the generation of the statistical data does not impact the reproduction operation.

Furthermore, generally unmodified signals in the test data will not be misrecognized as demonstrated with respect to the comparison study (see FIG. 5).

Alternatively, instead of determining a number of times a particular signal appears at a particular location, the CPU 102 determines the frequency (e.g., percentage) that a particular signal appears at a particular location, and compares the determined frequency to a threshold frequency given by the software 52. For the assumed compact disk, an example of the threshold frequency is 80%. If the determined frequency exceeds the threshold frequency, the CPU 102 stores the signal corresponding to the determined frequency as actual data. The CPU 102 repeats this process for each location to produce the statistical data.

Next, in step S50, the CPU 102 determines if the statistical data is the same as the reference data. If not, then in step S60, the CPU 102 identifies the optical disk as an illegal copy, displays a message on display 108 indicating the disk has not been authenticated and reproduction will be prohibited, and prohibits further reproduction of the disk. If, however, the statistical data is the same as the reference data, then in step S70 the CPU 20 permits reproduction.

As a further alternative, the test data forms part of the other data 58 for reproduction. In this alternative embodiment, after the optical disk has been authenticated in step S50, the statistical data is output, when appropriate, as the test data to permit proper reproduction of the optical disk.

When a cost illegally copies an optical disk copy protected according to the present invention, some of the modified signal As in the test data are copied as signal B. As a result, when the authentication operation discussed above is performed, each of the test data versions reproduced in step S30 includes signal B at these locations. Therefore, the statistical data includes signal B at this location as well, and the statistical data fails to match the reference data. Consequently, the illegally copied disk is identified, and reproduction is prohibited.

While the present invention has been described with respect to a compact disk and 8–14 transformation, the present invention is applicable to any optical disk and transformation technique. For instance, the present invention is applicable to digital versatile disks (DVDs) and 8–16 bit transformation.

The invention being thus described, it will be obvious that the same may be varied in many ways. Such variations are not to be regarded as a departure from the spirit and scope of the invention, and all such modifications are intended to be included within the scope of the following claims.

What is claim is:

1. A method for recording data in a copy protected manner on an optical disk, comprising:

modifying first signals in data to produce modified data such that when said modified first signals are reproduced, at least one of said modified first signals are erroneously reproduced, intentionally, as a second signal; and first recording said modified data on an optical disk.

2. The method of claim 1, wherein said first and second signals represent data having at least two zeros between successive ones.

3. The method of claim 1, wherein said modifying step at least one of advances and delays at least one of a leading edge and a trailing edge of said first signals.

4. The method of claim 1, wherein said modifying step one of shortens and lengthens a portion of said first signals in said time domain.

5. The method of claim 4, wherein said portion of said first signals represents data having a value of 0.

6. The method of claim 1, wherein said modifying step modifies said first signals such that when said modified first signals are reproduced, at least a random one of said modified first signals are erroneously reproduced as said second signal.

7. The method of claim 1, wherein said first and second signals represent first and second codes differing in a number of zeros between subsequent ones.

8. The method of claim 1, wherein said first recording step records each modified first signal such that a pit forming a portion of said modified first signal is longer than a same pit formed when recording said first signal.

9. The method of claim 1, wherein
said first and second signals differ in that when recorded, a pit forming a portion of said second signal is longer than a corresponding pit forming a corresponding portion of said first signal; and
said modifying step modifies each first signal such that when recorded, said corresponding pit forming said corresponding portion of said modified first signal is lengthened.

10. The method of claim 1, wherein
said first recording step records each modified first signal such that a pit forming a portion of said modified first signal is shorter than a same pit formed when recording said first signal.

11. The method of claim 1, wherein
said first and second signals differ in that when recorded, a pit forming a portion of said second signal is shorter than a corresponding pit forming a corresponding portion of said first signal; and
said modifying step modifies each first signal such that when recorded, said corresponding pit forming said corresponding portion of said modified first signal is shortened.

12. The method of claim 1, further comprising:
second recording said data on a first portion of said optical disk; and wherein
said first recording step records said modified data on a second portion of said optical disk, and said first and second recording steps are performed in any order.

13. The method of claim 12, further comprising:
third recording information on said optical disk indicating a location of said data and said modified data, and said first, second and third recording steps are performed in any order.

14. A method for recording data in a copy protected manner on an optical disk, comprising:
receiving data including first signals;
first recording said data on a first area of an optical disk such that a pit forming a portion of at least one of said first signals is lengthened.

15. The method of claim 14, wherein said pit of said first signal represents data having a value of 0.

16. The method of claim 14, wherein a length of said lengthened pit is less than a length of a corresponding pit forming a portion of a second signal.

17. The method of claim 16, wherein said first and second signals represent first and second codes differing in a number of zeros between subsequent ones.

18. A method for recording data in a copy protected manner on an optical disk, comprising:
receiving data including first signals;
first recording said data on a first area of an optical disk such that a pit forming a portion of at least one of said first signals is shortened.

19. The method of claim 18, wherein said pit of said first signal represents data having a value of 0.

20. The method of claim 18, wherein a length of said shortened pit is greater than a length of a corresponding pit forming a portion of a second signal.

21. The method of claim 20, wherein said first and second signals represent first and second codes differing in a number of zeros between subsequent ones.

22. An apparatus for recording data in a copy protected manner on an optical disk, comprising:

an optical disk recording device for recording data on an optical disk;
a controller controlling said optical disk recording device to record modified data including modified first signals on said optical disk, said modified first signals having been modified such that when said modified first signals are reproduced, at least one of said modified first signals are erroneously reproduced, intentionally, as a second signal.

23. The apparatus of claim 22, wherein said first and second signals represent data having at least two zeros between successive ones.

24. The apparatus of claim 22, wherein said modified first signals have been modified by at least one of advancing and delaying at least one of a leading edge and a trailing edge of said first signals.

25. The apparatus of claim 22, wherein said modified first signals have been modified by one of shortening and lengthening a portion of said first signals in said time domain.

26. The apparatus of claim 25, wherein said portion of said unmodified first signals represents data having a value of 0.

27. The apparatus of claim 22, wherein said modified first signals have been modified such that when said modified first signals are reproduced, at least a random one of said modified first signals are erroneously reproduced as said second signal.

28. The apparatus of claim 22, wherein unmodified first signals and said second signals respectively represent first and second codes differing in a number of zeros between subsequent ones.

29. The apparatus of claim 22, wherein
said controller controls said optical disk recording device to record said modified first signals such that a pit forming a portion of said modified first signal is longer than a same pit formed when recording an unmodified first signal.

30. The apparatus of claim 22, wherein
an unmodified first signal and said second signal differ in that when recorded, a pit forming a portion of said second signal is longer than a corresponding pit forming a corresponding portion of said unmodified first signal; and
said controller controls said optical disk recording device to record said modified first signal such that when recorded, said corresponding pit forming said corresponding portion of said modified first signal is lengthened.

31. The apparatus of claim 22, wherein said controller controls said optical disk recording device to record said modified first signals such that a pit forming a portion of said modified first signal is shorter than a same pit formed when recording an unmodified first signal.

32. The apparatus of claim 22, wherein
an unmodified first signal and said second signal differ in that when recorded, a pit forming a portion of said second signal is shorter than a corresponding pit forming a corresponding portion of said unmodified first signal; and
said controller controls said optical disk recording device to record said modified first signal such that when recorded, said corresponding pit forming said corresponding portion of said modified first signal is shortened.

33. The apparatus of claim 22, wherein
said controller controls said optical disk recording device to record said modified data and unmodified data, corresponding to said modified data, in first and second portions of said optical disk.

34. The apparatus of claim 33, wherein
said controller controls said optical disk recording device to record information on said optical disk indicating a location of said unmodified data and said modified data.

35. An apparatus for recording data in a copy protected manner on an optical disk, comprising:
an optical disk recording device for recording data on an optical disk;
a controller controlling said optical disk recording device to record data on a first area of an optical disk such that a pit forming a portion of at least one of said first signals is lengthened.

36. The apparatus of claim 35, wherein said pit of said first signal represents data having a value of 0.

37. The apparatus of claim 35, wherein a length of said lengthened pit is less than a length of a corresponding pit forming a portion of a second signal.

38. The apparatus of claim 32, wherein said first and second signals represent first and second codes differing in a number of zeros between subsequent ones.

39. An apparatus for recording data in a copy protected manner on an optical disk, comprising:
an optical disk recording device for recording data on an optical disk;
a controller controlling said optical disk recording device to record data on a first area of an optical disk such that a pit forming a portion of at least one of said first signals is shortened.

40. The apparatus of claim 39, wherein said pit of said first signal represents data having a value of 0.

41. The apparatus of claim 39, wherein a length of said shortened pit is greater than a length of a corresponding pit forming a portion of a second signal.

42. The apparatus of claim 41, wherein said first and second signals represent first and second codes differing in a number of zeros between subsequent ones.

43. A copy protected recording medium having a data structure stored thereon, said data structure comprising:
a test area storing test data, said test data including modified first signals, said modified first signals having been modified such that when said modified first signals are reproduced, at least one of said modified first signals are erroneously reproduced, intentionally, as a second signal.

44. The copy protected recording medium of claim 43, wherein said first and second signals represent data having at least two zeros between successive ones.

45. The copy protected recording medium of claim 43, further comprising:
a reference area storing reference data, said reference data and said test data being identical except said reference data includes unmodified first signals.

46. The copy protected recording medium of claim 43, wherein
said test area includes, for each modified first signal, a pit representing a portion of said modified first signal which is longer than a same pit formed when recording an unmodified first signal.

47. The copy protected recording medium of claim 43, wherein said test area includes, for each modified first signal, a pit representing a portion of said modified first signal which is shorter than a same pit formed when recording an unmodified first signal.

* * * * *